(12) United States Patent
Barton

(10) Patent No.: US 8,789,955 B2
(45) Date of Patent: Jul. 29, 2014

(54) CAMERA VISOR

(76) Inventor: Alan Barton, Marland, OK (US)

( * ) Notice: Subject to any disclaimer, the term of this patent is extended or adjusted under 35 U.S.C. 154(b) by 262 days.

(21) Appl. No.: 13/023,948

(22) Filed: Feb. 9, 2011

(65) Prior Publication Data

US 2011/0194184 A1  Aug. 11, 2011

Related U.S. Application Data

(60) Provisional application No. 61/303,293, filed on Feb. 10, 2010.

(51) Int. Cl.
*G03H 1/12* (2006.01)
*G03B 17/56* (2006.01)
*G03B 11/04* (2006.01)

(52) U.S. Cl.
CPC ............... *G03B 11/04* (2013.01); *G03B 17/56* (2013.01)
USPC .......................................... 359/511

(58) Field of Classification Search
USPC ............... 359/507, 511, 611, 612; 206/316.1, 206/316.2, 316.3
See application file for complete search history.

(56) References Cited

U.S. PATENT DOCUMENTS

| | | | |
|---|---|---|---|
| 4,668,058 A * | 5/1987 | Wright | 359/507 |
| 6,021,984 A * | 2/2000 | Mills | 248/219.4 |

* cited by examiner

*Primary Examiner* — Jennifer L. Doak
(74) *Attorney, Agent, or Firm* — Martin S. High, P.C.

(57) ABSTRACT

The embodiments of the Camera Visor comprise a top surface and a rear surface. The rear surface forms a plurality of attachment slots. Through the attachment slots the user can insert a strap, belt or rope to secure the Camera Visor to a support structure. The Camera Visor is placed over a wildlife camera or other type of outdoor surveillance camera or other electronic equipment to shield the camera or electronic equipment from the sun, rain and other elements. In another embodiment, the Camera Visor is also comprised of two side flaps and a front rim and a back rim. The front rim and back rim serve to channel water through the side water channels so as to direct the water down the side flaps and away from the camera.

6 Claims, 7 Drawing Sheets

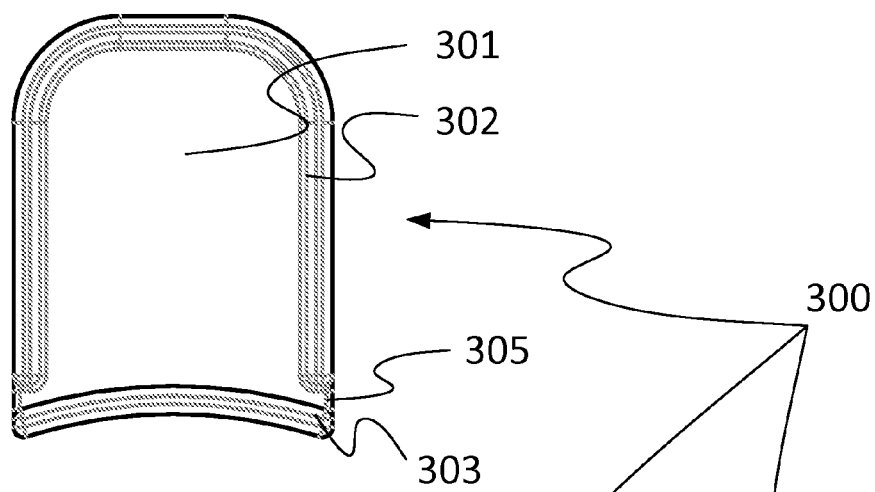
FIG 4A
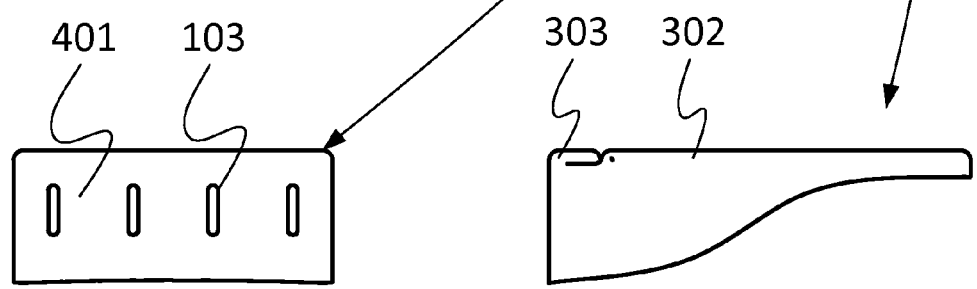
FIG 4B          FIG 4C

CAMERA VISOR

CROSS-REFERENCE TO RELATED APPLICATIONS

This application claims priority of U.S. Provisional Patent Application with Ser. No. 61/303,293 of the same title filed on Feb. 10, 2010. The entire contents of U.S. Provisional Patent Application with Ser. No. 61/303,293 are herein incorporated by reference.

STATEMENT REGARDING FEDERALLY SPONSORED RESEARCH OR DEVELOPMENT

Not applicable

FIELD OF THE EMBODIMENTS

The field of the embodiments is generally enclosures and shields for photographic or electronic equipment. More specifically, but not exclusively, the embodiments deal with camera protection and visors use to shield wildlife, outdoor or surveillance cameras from the elements and sunlight.

BACKGROUND OF THE EMBODIMENTS

The embodiments of the Camera Visor provide a means of protecting and shielding from the weather or sun camera or other electronic equipment. Wildlife and surveillance cameras are commonly deployed to photograph wildlife or passersby. These cameras are commonly placed on a support and left for extended periods of time. While these cameras are on the support, they are exposed to the sun, rain, snow, and other deleterious weather conditions. Further, without a shade the photographs can have a lesser quality due to the position of the sun or shadows impinging on the camera.

SUMMARY OF THE EMBODIMENTS

In an embodiment of the Camera Visor, the Camera Visor is comprised of a polymer sheet comprised of a top surface and a back flange. The back flange of the polymer sheet is folded downwards relative to the top surface. The back flange is integrally formed to the top surface and together the top surface and the back flange form one continuous surface although they are essentially perpendicular with one another. The back flange forms a plurality of fastener slots. In one embodiment, the plurality of fastener slots is four fastener slots.

In other embodiments of the Camera Visor the polymer sheet is folded down on the back edge and on both sides to form side surfaces 304. In an embodiment of the Camera Visor the back edge forms a plurality of slots through which a belt or strap of flexible material may be threaded in which to secure the plastic sheet to a vertical support object such as a tree or a post. This embodiment of the Camera Visor then is placed over top of photographic or other type of electronic material to shield the electronic photographic or electronic material from the elements.

In this respect, it is to be understood that the embodiments in this application are not limited to the details of construction and to the arrangements of the components set forth in the description or illustrated in the drawings. The embodiments are capable of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the embodiments described in this application. Additional benefits and advantages of the present embodiments will become apparent in those skilled in the art to which the embodiments relate from the description of the preferred embodiment and the appended claims, taken in conjunction with the accompanying drawings. It is important, therefore, that the claims be regarded as including such equivalent constructions insofar as they do not depart from the spirit and scope of the embodiments described herein.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the embodiments of the application which is measured by the claims, nor is it intended to be limiting as to the scope of the embodiments in any way.

BRIEF DESCRIPTION OF THE DRAWINGS

FIG. 4A is a top view of an embodiment of the Camera Visor with side panels; FIG. 4B is a rear view of an embodiment of the Camera Visor with side panels; FIG. 4C is a side view of an embodiment of the Camera Visor with side panels.

DETAILED DESCRIPTION OF THE PREFERRED EMBODIMENTS

Figure 1:
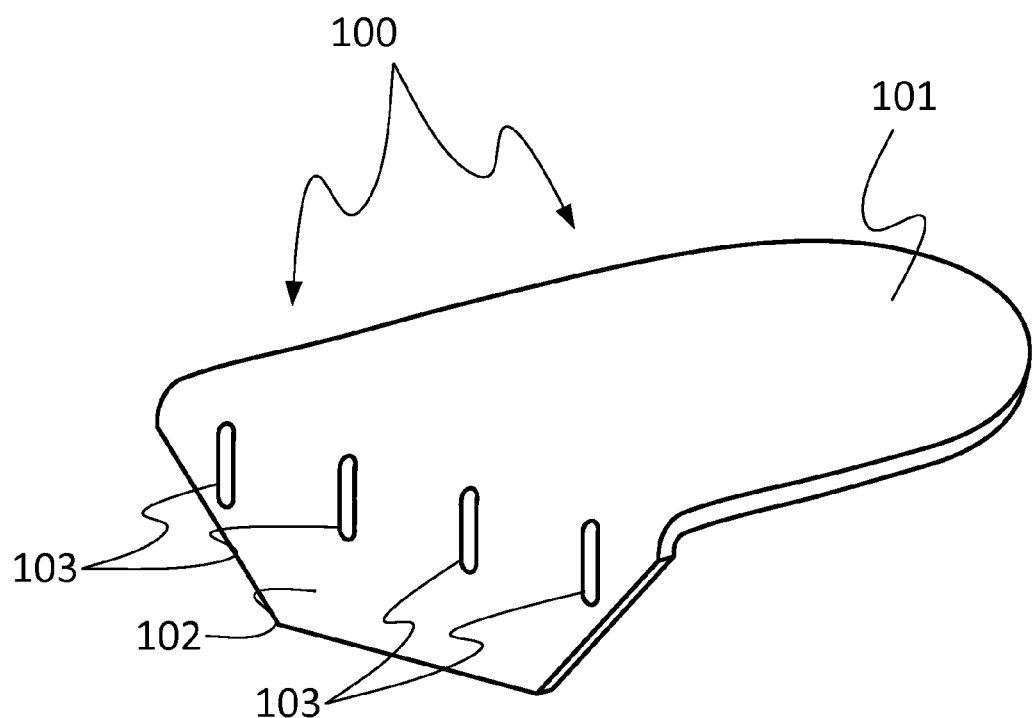
FIG. 1 is a rear view of an embodiment of the Camera Visor without side panels.
Figure 2:
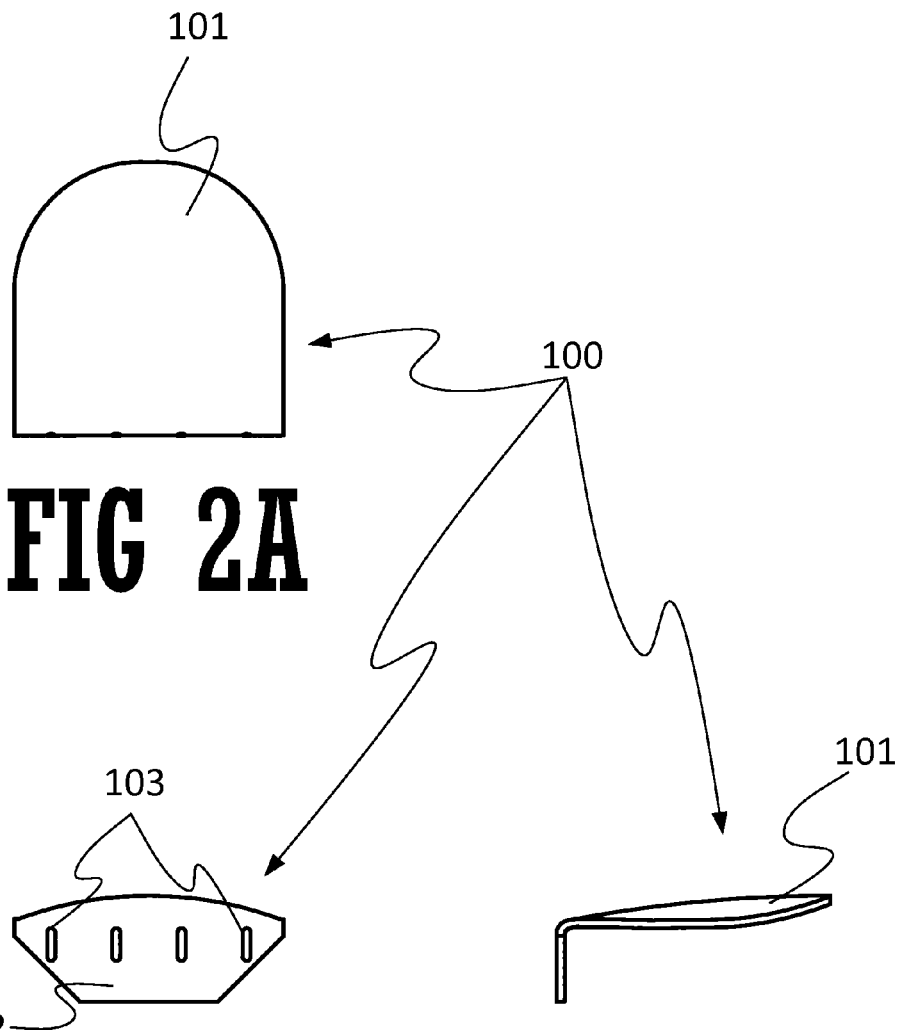
FIG. 2A is a top view of an embodiment of the Camera Visor without side panels.
FIG. 2B is a rear view of an embodiment of the Camera Visor without side panels.
FIG. 2C is a side view of an embodiment of the Camera Visor without side panels.
Figure 3:
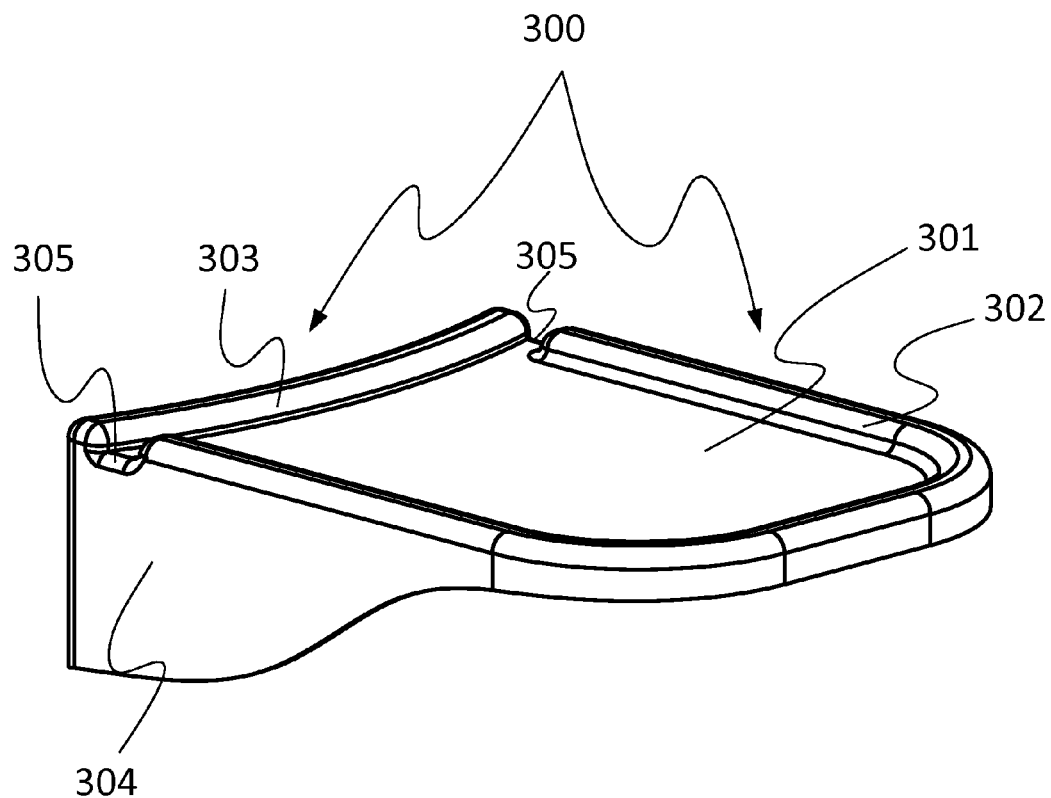
FIG. 3 is a perspective view of an embodiment of the Camera Visor with side panels.
Figure 5:
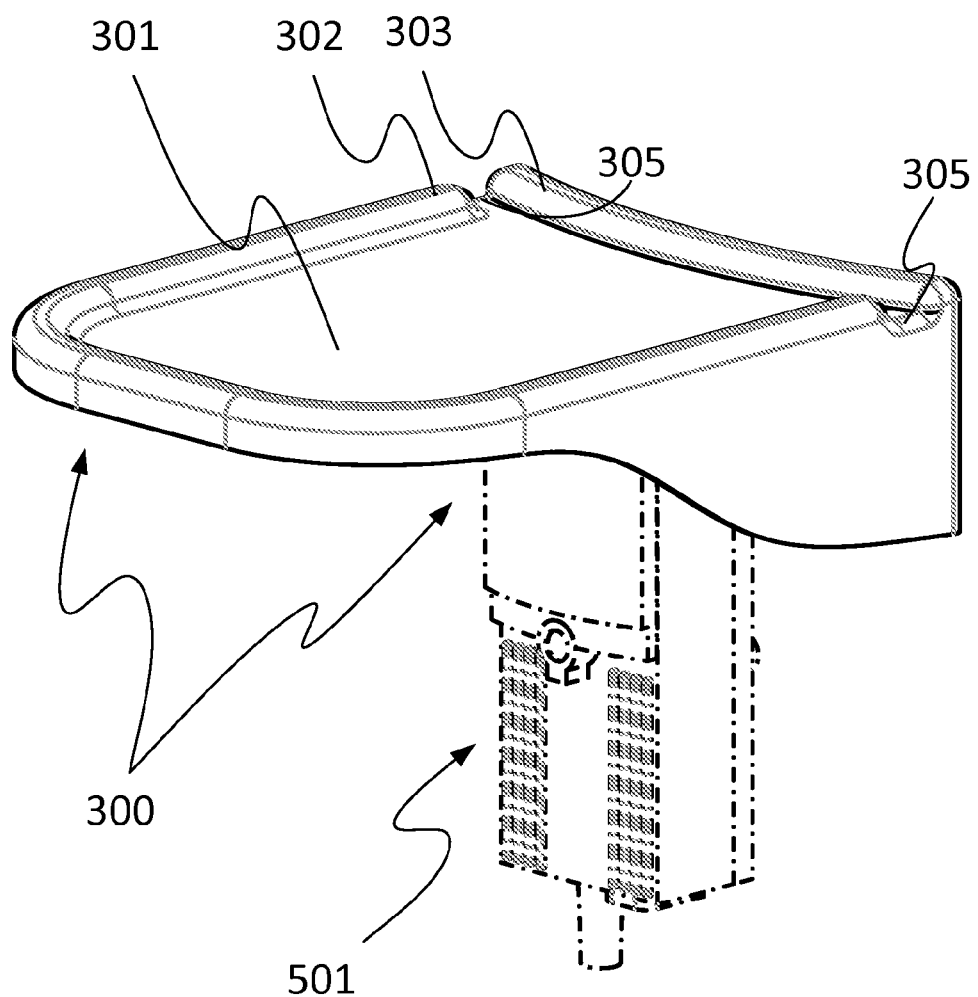
FIG. 5 is a perspective view of an embodiment of the Camera Visor with side panels showing the placement of the embodiment above an exemplar wildlife camera.
Figure 6:
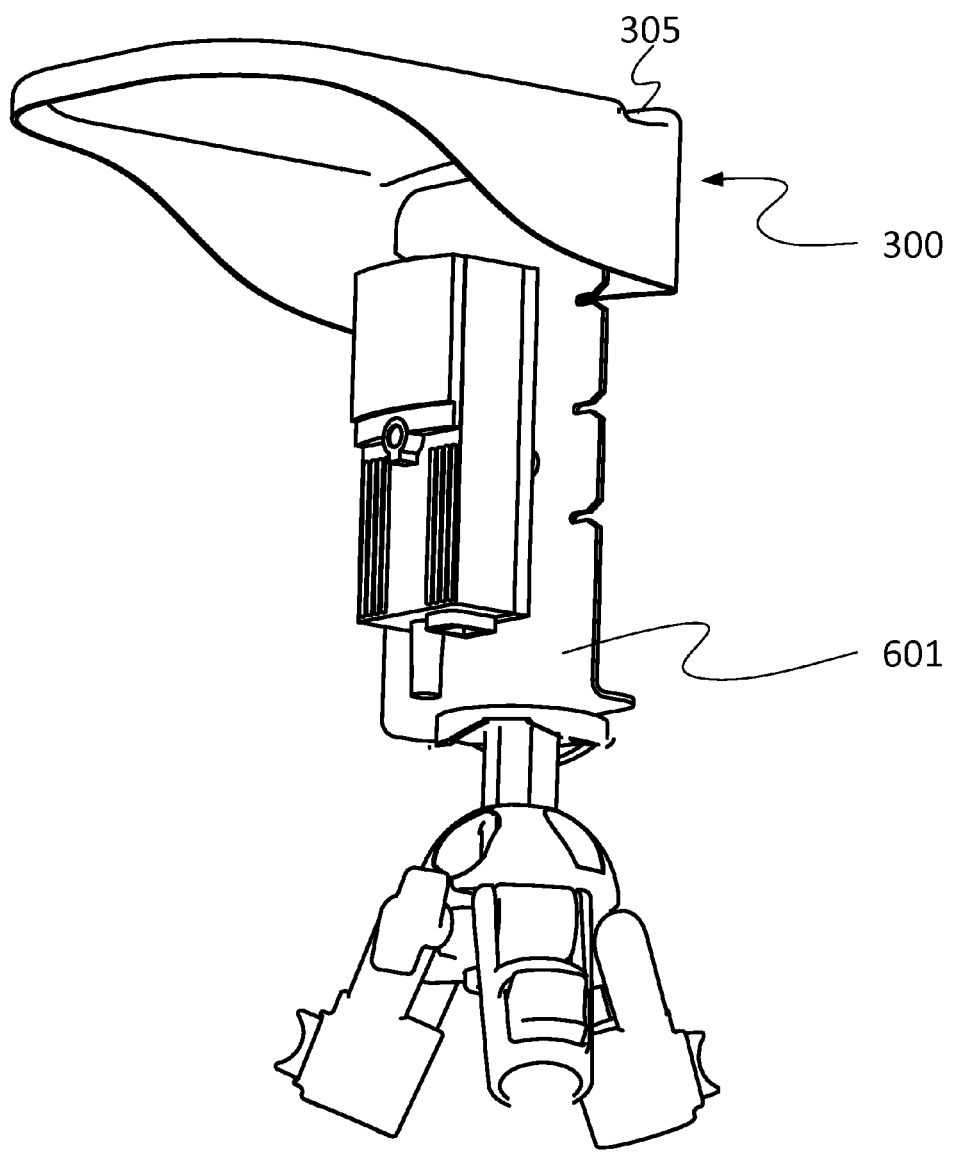
FIG. 6 is a perspective view of an embodiment of the Camera Visor mounted on a tripod.
Figure 7:
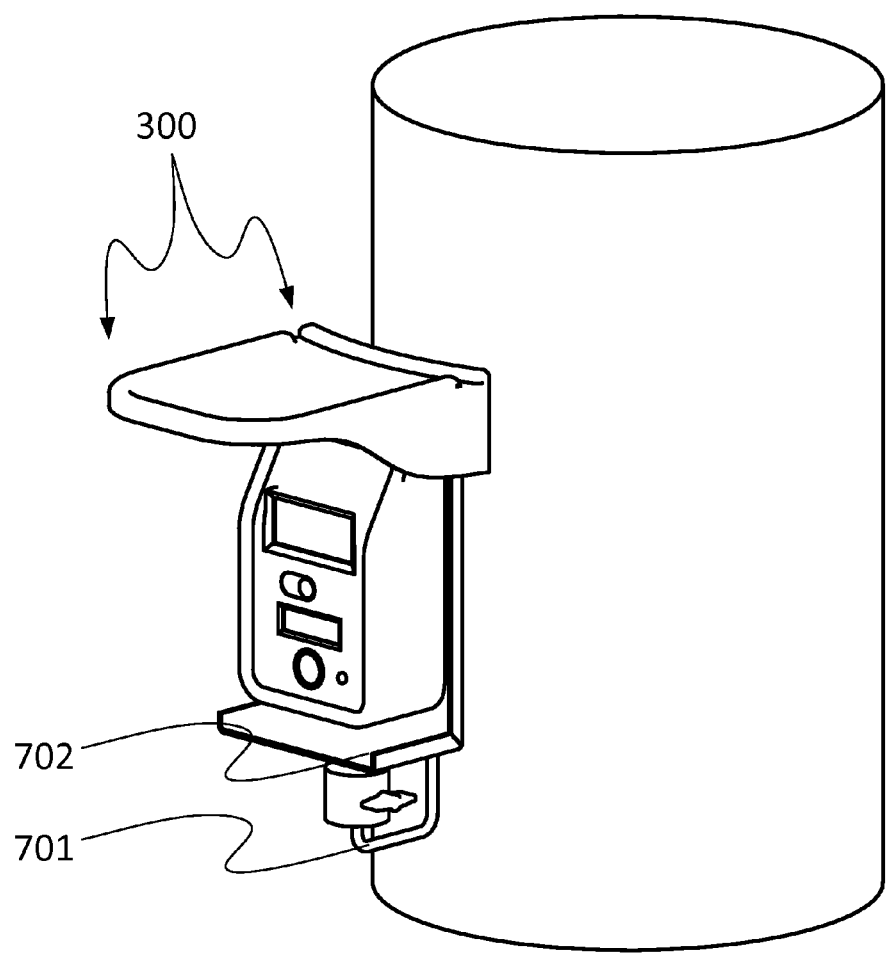
FIG. 7 is a perspective view of an embodiment of the Camera Visor secured to a tree mount.

All embodiments of the Camera Visor are comprised of a polymeric sheet material approximately 1/16 to 1/4 inch in thickness. The term camera means any electronic or photographic device that requires protection or shielding by the Camera Visor 100, and in no way does the term camera limit the application to protection and shielding of imaging equipment, but includes other type of weather-sensitive or element-sensitive electronic or non-electronic equipment.

The polymeric sheet material is comprised of any polymeric material including without limitation polyethylene, polypropylene, polystyrene, or a combination of these or recycled polymeric materials. The embodiments are formed any process that can manufacture formed polymeric articles including injection molding of the desired polymeric material resin. Alternatively, the polymeric sheet is formed as a flat sheet and then thermoformed into the desired shape or shapes more fully detailed below in the several embodiments of the Camera Visor 100. Thermoforming means a manufacturing process where a plastic sheet is heated to a pliable forming temperature, formed to a specific shape in a mold, and trimmed to create a usable product.

In an embodiment, the Camera Visor 100 is comprised of a polymer sheet comprised of a top surface 101 and a back flange 102. The back flange 102 of the polymer sheet is folded downwards relative to the top surface 101 at essentially a 90 degree angle. The back flange 102 is integrally formed to the top surface 101 and together the top surface 101 and the back flange 102 form one continuous surface; the top surface 101 and the back flange 102 are formed so that they are essentially perpendicular with one another. The back flange 102 forms a plurality of fastener slots 103. In an embodiment, the plurality of fastener slots 103 is four fastener slots 103.

In another embodiment of the Camera Visor 300, the embodiment is comprised of a rimmed top surface 301, a rimmed back flange 401 and two side flanges 302. The rimmed back flange 301 is folded downwards from the back edge of the rimmed top surface 301. The side flanges 302 are folded downwards from the side edges of the rimmed top surface 301. The rimmed back flange 401 forms a plurality of fastener slots 103. In another embodiment, the plurality of fastener slots 103 is four fastener slots 103. The fastener slots can be used to secure the Camera Visor 300 over a camera 501 by threading a belt or strap of flexible material through the fastener slots 103 and in turn around a vertical support object. The term vertical support object means any essentially vertical object that can be used to secure the embodiment of the Camera Visor 300 over a camera 501. Examples of a vertical support object include a tree, a fence post, or metallic structure. The embodiment Camera Visor 300 then is placed over the camera 501 to shield the camera 501 from the elements.

Further comprising various embodiments of the Camera Visor 300 are a front rim 302 and a rear rim 303. The front rim 302 is formed on the edge of the rimmed top surface 301 around the front and sides of the rimmed top surface 301. The rear rim 303 is formed on the back edge of the rimmed top surface. Further, the front rim 302 and back rim 301 forms a channel 305 at the back of the Camera Visor. The channel 303 serves to direct rainwater away from the camera 501 by forcing the water out through the channels 305.

In another embodiment, the Camera Visor 100 or Camera Visor 300 is secured to a visor tripod plate 601 which in turn is secured to a tripod thereby allowing the camera or electronic device to be mounted without the necessity of a vertical support object. The visor tripod plate 601 is comprised of a thin plate of polymeric or metallic material that can accept the fasteners or strap from the Camera Visor to secure the Camera Visor. The visor tripod plate in turn has a means to fasten the visor tripod plate to a tripod. The tripod also has a means to fasten a camera or electronic device. The visor tripod plate 601 allows the Camera Visor to shield the camera or electronic device while that device is secured on the tripod.

In another embodiment, the Camera Visor 100 or Camera Visor 300 is secured to a tree mount 701. The tree mount 701 is screwed or hammered directly into a tree or other vertical support object. The tree mount 701 is in turn attached to a tree flange 702 to which the Camera Visor 300 or 100 is attached to in a similar manner as described above.

In the best mode of operation of the embodiments, the Camera Visor 100 or Camera Visor 300 is attached to a vertical support object. The embodiments are attached to the vertical support object by fasteners inserted through the slots formed by the rear flap and these fasteners are in turn inserted into the vertical support object. Fasteners can include screws or nails. Alternatively a thin flexible band can be threaded through the slots on the back flap of the embodiments and wrapped around the vertical support object and either tied or buckled or otherwise fastened to the vertical support object. Then a wildlife or surveillance camera or other type of electronic device is placed underneath the embodiments so that the embodiments can shield the electronics or surveillance or wildlife camera from the elements or the sun. Alternatively, the Camera Visor can be secured to a visor tripod plate 701 which in turn is secured to a tripod allowing the allowing the camera or electronic device to be mounted without the necessity of a vertical support object.

What I claimed is:

1. A Camera Visor comprising
a top surface and a back flange, wherein the back flange is folded at essentially a 90 degree angle from the top surface, wherein the back flange forms four fastener slots through which fasteners can be inserted or a fastening strap can be threaded to attach the Camera Visor to a vertical support object;
two side flanges on both sides of the top surface wherein the side flanges are folded downwards from the side edges of the top surface at essentially a 90 degree angle;
a front rim;
a back rim wherein the front rim and back rim form a water channel through which water can drain off of the top surface towards the sides of the top surface and down the two side flanges around a camera or electronic device protected by the Camera Visor;
wherein the fastener slots can be used to secure the Camera Visor over a camera by threading a belt or strap of flexible material through the fastener slots and in turn around a vertical support object;
wherein the front rim and the back rim of the rimmed top surface are formed on the edge of the rimmed top surface to direct water to the back rim;
wherein the rimmed top surface is integrally formed with the top surface and the side flanges; and
wherein the front rim and the back rim of the rimmed top surface serve to direct rainwater away from the camera by forcing the water out through the water channels on each side of the back rim.

2. The Camera Visor as described in claim 1 comprising
a visor tripod plate wherein visor tripod plate is secured to a tripod thereby allowing the camera or electronic device to be mounted to a tripod without the necessity of another vertical support object.

3. The Camera Visor as described in claim 2 comprising
two side flanges on both side edges of the rimmed top surface, wherein the side flanges are folded downwards from the side edges of the rimmed top surface at essentially a 90 degree angle;
a front rim;
and a back rim wherein the front rim and back rim form a water channel through which water can drain off of the rimmed top surface and away from a camera or electronic device protected by the Camera Visor.

4. The Camera Visor as described in claim 3 wherein the visor tripod plate is comprised of a thin plate of polymeric or metallic material that can accept the fasteners or strap from the Camera Visor to secure the Camera Visor, and wherein the visor tripod plate in turn has a means to fasten the visor tripod plate to a tripod, and wherein the tripod also has a means to fasten a camera or electronic device.

5. The Camera Visor as described in claim 3 comprising
a tree mount and a tree flange wherein the tree mount is secured directly to vertical support object via fasteners such as screws or nails, wherein the tree mount is in turn attached to a tree flange to which the Camera Visor is attached.

6. A Camera Visor consisting of a top surface and a back flange, wherein the back flange is folded at essentially a 90 degree angle from the top surface, wherein the back flange forms four fastener slots through which fasteners can be inserted or a fastening strap can be threaded to attach the Camera Visor to a vertical support object, and wherein the fastener slots can be used to secure the Camera Visor over a camera by threading a belt or strap of flexible material through the fastener slots and in turn around a vertical support object;

two side flanges on both sides of the top surface wherein the side flanges are folded downwards from the side edges of the top surface at essentially a 90 degree angle;

a front rim; and wherein the front rim and the back rim of the rimmed top surface are formed on the edge of the rimmed top surface to direct water toward the back rim;

wherein the rimmed top surface is integrally formed with the top surface and the side flanges; and wherein the front rim and the back rim of the rimmed top surface serve to direct rainwater away from the camera by forcing the water out through the water channels on each side of the back rim.

\* \* \* \* \*